Figure 1:
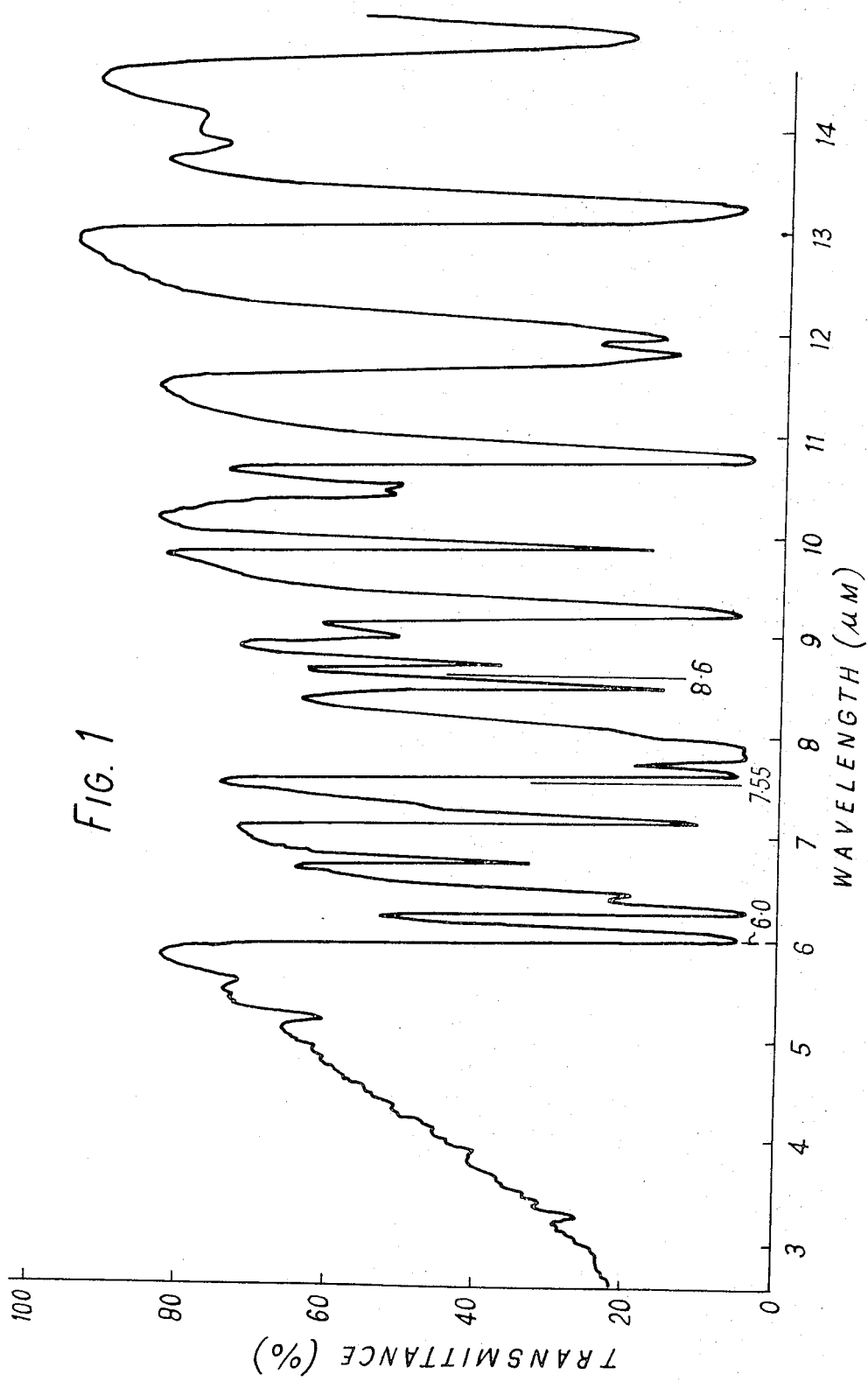

United States Patent [19]
Feasey

[11] 3,819,582
[45] June 25, 1974

[54] POLYSULPHONES
[75] Inventor: Ronald George Feasey, Knebworth, England
[73] Assignee: Imperial Chemical Industries Limited, London, England
[22] Filed: Nov. 29, 1971
[21] Appl. No.: 202,986

[52] U.S. Cl. ......... 260/63 R, 260/30.2, 260/30.8 R, 260/32.6 R, 260/49, 260/79
[51] Int. Cl. ............................................ C08g 23/20
[58] Field of Search ........ 260/49, 63 R, 47 R, 79 R, 260/79.3 A

[56] References Cited
UNITED STATES PATENTS
3,274,165 9/1966 Lenz et al. ........................... 260/79
3,326,865 6/1967 Smith ................................. 260/79.3
3,634,355 1/1972 Barr et al. ............................. 260/49

FOREIGN PATENTS OR APPLICATIONS
1,177,183 1/1970 Great Britain .................... 260/47 R

*Primary Examiner*—Lester L. Lee
*Attorney, Agent, or Firm*—Cushman, Darby & Cushman

[57] ABSTRACT

A method for the production of aromatic polymers whose molecular chains comprise benzenoid and sulphur atoms in which the alkali metal salt of a thiphenol containing a halogen atom activated by an inert electron-attracting group is polymerised by the displacement of alkali metal halide.

1 Claim, 2 Drawing Figures

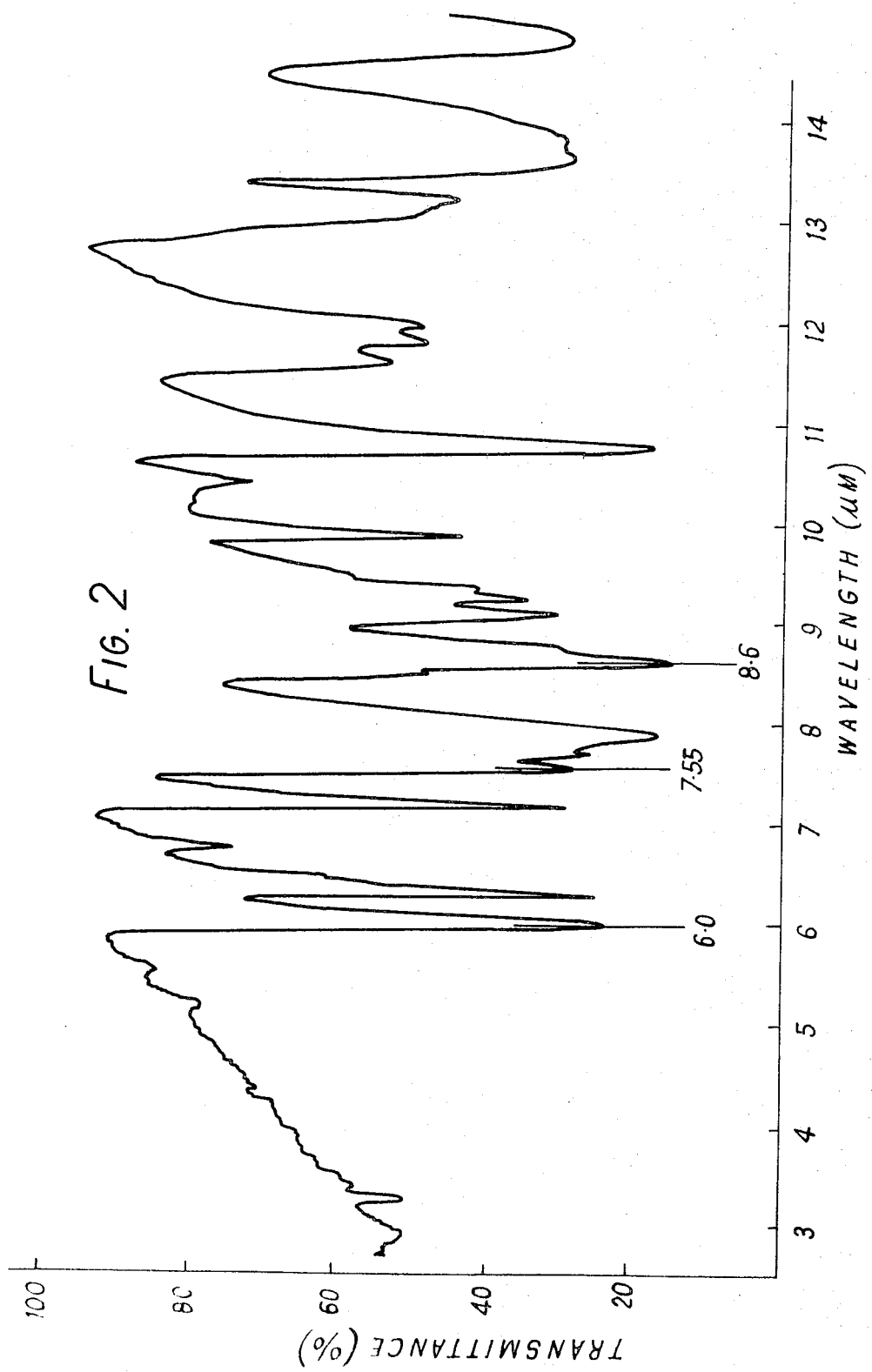

POLYSULPHONES

This invention relates to the production of aromatic polymers, the molecular chains of which comprise benzenoid groups, sulphur atoms and sulphone or carbonyl groups.

According to British specification No. 1,153,035 polymers may be produced by heating an alkali metal salt of a phenol containing a halogen atom activated by a carbonyl or sulphonyl group, by the displacement of alkali metal halide. In particular, aromatic polymers the chains of which comprise para-phenylene groups, oxygen atoms and sulphone or carbonyl groups are produced by a method in which the alkali metal salts of 4-(4-halogenophenyl sulphonyl)phenol or 4-(4-halogenobenzoyl)phenol are caused to react with displacement of alkali metal halide. We have now found that aromatic polymers containing linking sulphur atoms can be similarly produced.

According to the present invention a method is provided for the production of aromatic polymers whose molecular chains comprise benzenoid groups and sulphur atoms in which an alkali metal salt of a thiophenol containing a halogen atom activated by an inert electron attracting group is polymerised by the displacement of alkali metal halide.

The halogen atom in the thiophenol is preferably chlorine. The iodo and bromo derivatives generally are more reactive to thiophenates and enable the displacement of alkali metal halide to be carried out more quickly, but are more expensive.

Any thiophenol is suitable for the invention provided the halogen atom is linked to a benzene ring which has an electron-attracting group, preferably ortho or para to the halogen atom.

Any electron-attracting group inert under the conditions of the reaction can be used as the activating group in these compounds. The more powerful electron-attracting groups give the highest reaction rates and are therefore preferred. Electron-donating groups should be absent from the same benzenoid ring as the halogen. It may be a univalent group for example, a nitro, phenylsulphonyl, alkylsulphonyl, cyano, trifluoromethyl or nitroso group, or heteronitrogen as in pyridine; or it may be a bivalent group for example a sulphone, sulphoxide, azo, carbonyl, vinylene, vinylidene, tetrafluoroethylene or organic phosphine oxide group; or it may be a bivalent group that can activate halogen atoms on the same ring, as in the case of difluorobenzoquinone and 1,4-, 1,5- or 1,8-difluoroanthraquinone.

In particular, the thiophenol may have the formula

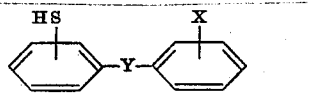

in which X is a halogen atom and Y is —SO₂—, —SO— or —CO— or a radical of the formula —Y¹—A—Y² in which Y¹ and Y² may be the same or different and each is —SO₂—, —SO— or —CO— and A is a bivalent organic radical, which may be aliphatic, aromatic or heterocyclic and has both valencies linked to carbon atoms. For example A may be a bivalent aromatic radical derived from benzene, a fused-ring aromatic hydrocarbon containing not more than two aromatic rings (for example naphthalene, indene, fluorene or dibenzofuran), or a compound of the formula

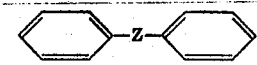

in which Z is a direct link, —O—, —S—, —SO₂—, —CO—, a bivalent hydrocarbon or substituted hydrocarbon radical (e.g. alkylene, alkylidene or a bivalent cycloaliphatic or aromatic radical), or a residue of an organic diol (i.e., the bivalent radical obtained by removing the hydrogen atoms from the two hydroxy groups). The halogen atom and the thiol group in the thiophenol are preferably in the para position to the bridging group Y, because the essentially all-para polymers that can be made from them have better physical properties as thermoplastic materials.

Lower alkyl, alkoxy or alkylthio groups may be present as substituents on any of the aromatic rings but are preferably absent from the halogen-bearing ring and are also preferably absent altogether when the aromatic polymer is required to be stable at high temperatures.

Preferred thiophenols are

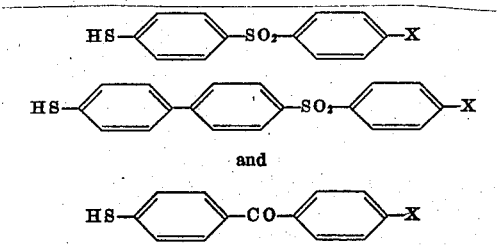

If desired the polymers can be prepared from mixtures of two or more thiophenols, or from a mixture of thiophenol and phenol, and these may contain different electron-attracting groups.

The alkali metal cation associated with the thiophenol is conveniently potassium or sodium. Some or all of the alkali metal cation in the reagent may be replaced by an organic onium cation having a positively charged heteroatom (for example a quaternary ammonium cation such as tetramethylammonium) stable under the conditions of the reaction, and the term "alkali metal salt" as used herein is deemed to refer also to salts containing such onium cations.

The reaction may be carried out in the melt or in the presence of a dipolar aprotic liquid.

Suitable liquids for the reaction include, the lower dialkyl and cyclic alkylene sulphoxides and sulphones (e.g. dimethyl sulphoxide and 1,1-dioxothiolan), nitriles (e.g. benzonitrile), diaryl ketones (e.g. benzophenone), diaryl sulphoxides and sulphones, ethers (e.g. dioxane, diethylene glycol dimethyl ether, diphenyl ether, methoxyphenyl ethers). The amount of the liquid is relatively unimportant provided it is sufficient to dissolve the alkali metal salt of the thiophenols and is not too large to be economically disadvantageous.

The rate of polymer formation in the reaction of the invention rises with rise of temperature and below 100°C is uneconomically slow. Temperatures up to 400°C may be employed, and 120°–300°C is usually convenient.

The vessel used should be made of or lined with a material that is inert to thiophenates and also to alkali metal halides under the conditions employed. For example, some grades of stainless steel undergo surface crazing at these temperatures in the presence of alkali metal halide, and vessels made of or lined with titanium or nickel or an alloy thereof or some similarly inert material are preferable.

The reduced viscosity of the polymer is desirably at least 0.3 (measured at 25°C on a solution in a solvent, e.g. dimethyl formamide, N-methyl pyrrolidone, concentrated sulphuric acid, containing 1 g of polymer in 100 cm³ of solution if it is to serve for structural purposes.

To neutralise any reactive oxygen- or sulphur-containing anions, a reagent therefor may be introduced at the termination of the polymerisation. Reactive monofunctional halides, for example methyl chloride, are particularly suitable.

The polymeric products of low molecular weight which may be produced by the method of the invention e.g. those formed at temperatures below 100°C may find industrial uses directly, for example as sizes and finishes or as lubricant additives or thickeners for non-aqueous liquids. The low polymers are also useful as intermediates for the production of various high polymers.

The polymers of high molecular weight are thermoplastic and may be used for a variety of applications such as for example mouldings, films or they may be oxidised to give the corresponding aromatic polysulphone by for example the method described in German specification No. 1938806 or in Swiss Pat. specification No. 491981.

A preferred polymer consists of repeat units of the formula

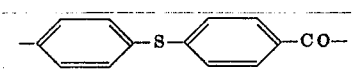

(I)

is crystalline with a melting point of over 350°C and an infrared spectrum having strong absorption at 6.0 μm but absence of absorption at 7.55 μm and 8.6 μm. Polymer (I) may be oxidised to a polymer consisting of repeat units having the formula

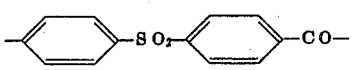

which has infra-red spectrum showing strong absorption at 6.0, 7.55 and 8.6 μm.

When the polymer is formed in solution, convenient procedure is to add the reaction mixture (which may be decanted or filtered from solid alkali metal halide) to an excess of a liquid which is miscible, or is miscible with the reaction solvent but in which the polymer is insoluble. If the reaction solvent is water-miscible with a liquid in which residual alkali metal halide also dissolves, the polymer can thus be obtained in one step. Otherwise, as for example if the reaction mixture is poured into methanol, the precipitated polymer initially contains alkali metal halide which can subsequently be washed out with water.

The following examples illustrate the invention.

EXAMPLE 1

Aqueous potassium hydroxide solution (3.86 g; 0.0337 moles; 114.5 g/mole) was added to a solution under nitrogen of 4-(4-chlorophenyl sulphonyl) thiophenol (9.60 g; 0.0337 moles) in dimethyl formamide (15 cm³) which had been degassed by bubbling nitrogen through the solvent for 0.5 hour in a round bottomed flask (capacity 100 cm³) fitted with a stirrer and a Dean and Stark still head. The flask was immersed in an oil bath. Benzene (25 cm³) similarly degassed was then added and water was removed by azeotropic distillation. Benzene was removed from the flask whilst the temperature of the oil bath remained at 140°C. The reaction was continued at this temperature for 3.5 hours and the resulting mixture was macerated with water, washed with boiling water (2 × 400 cm³) and methanol (2 × 300 cm³) and dried. The resulting polymer had repeat units

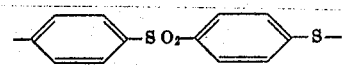

EXAMPLE 2

Aqueous potassium hydroxide solution (4.03 g; 0.0351 moles; 114.9 g/mole) was added to a solution under nitrogen of 4-(4-chlorophenyl sulphonyl) thiophenol (10.00 g; 0.0351 moles) in degassed N-methyl pyrrolidone (15 cm³) in a round bottomed flask as described in Example 1. Degassed benzene (25 cm³) was then added and water was removed by azeotropic distillation. Benzene was distilled from the flask and the temperature of the oil bath raised from 140° to 180°C. The reaction was continued at 180°C for 5 hours and the resulting mixture was then worked up as described in Example 1. The resulting polymer had repeat units

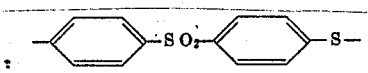

and had a reduced viscosity of 0.35 as measured at 25°C on a solution in N-methyl pyrrolidone of 1 g of polymer in 100 cm³ of solution. Fibres were drawn from the melt of the polymer. A sample of the polymer was compression-moulded at 250°C to give a pale amber film which could be creased without fracture.

EXAMPLE 3

4-(4-chlorobenzoyl) thiophenol (20.00 g; 0.0804 mole), aqueous potassium hydroxide (4.51 g; 114.5 g mole⁻¹ solution), 1,1-dioxothiolan (30 g) and diphenyl sulphone (30 g) were heated for 3 hours at reduced pressure (15 torr) to remove any water that had been formed and 1,1-dioxothiolan at a temperature initially 20°C rising to 260°C. The reaction mixture became solid. The reaction mixture was allowed to cool, and then heated under an atmosphere of dry nitrogen at 350°C for 3 hours. The mixture became fluid at 340°C. The mixture was allowed to cool and the product which solidified was removed from the flask, ground to a fine powder, and extracted with boiling methanol (4 × 400 cm³), then boiling water (2 × 400 cm³), again with boiling methanol (400 cm³), and was dried. The resulting product had a reduced viscosity of 0.73 (as measured at 25°C on a solution in concentrated sulphuric acid of 1 g polymer in 100 cm³ of solution), was crystalline, had a crystalline melting point of 352°C and could be moulded at 370°C into a brittle film. The infra-red spectrum (FIG. 1 accompanying this specification) of the polymer showed strong absorption at 6.0 μm from the carbonyl group but absence of absorption peaks at both 7.55 μm and 8.6 μm indicated that no —SO₂— groups were present and was consistent with its comprising repeat unit having the formula (I)

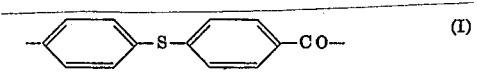
(I)

Poly(phenylene ketone sulphide) (I) (2g) was suspended in glacial acetic acid (50 cm³) and aqueous hydrogen peroxide (1.9 cm³; 50% w/w aqueous solution) was added. The reaction mixture was heated under reflux for 2 hours, allowed to cool, and was poured into water (400 cm³). The resulting white solid was washed with boiling water (2 × 400 cm³), then with methanol (400 cm³), and was dried. The reduced viscosity was 0.61 as measured at 25°C on a solution in concentrated sulphuric acid containing 1 g of polymer in 100 cm³ of solution. The product which was crystalline with a melting point of 375°C could be compression-moulded at 390°C, but the tough film produced was amorphous. The infra-red spectrum (FIG. 2 accompanying this specification) of the polymer showed strong absorption at 6.0, 7.55 and 8.6 μm and was consistent with its comprising repeat units having the formula

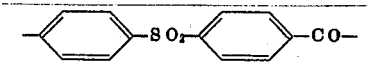

The thiophenols of the examples may be made by a process in which bis(4-chlorophenyl)sulphone or bis(4-chlorophenyl) ketone is reacted with sodium disulphide, the molar ratio of disulphide to chlorocompound being between 1.0 and 2.0. The thiophenol is precipitated from that reaction mixture by acidification and separating, washing and drying the precipitate.

I claim:

1. An oxidation product of an aromatic polymer having a reduced viscosity of at least 0.3 as measured at 25°C on a solution of the polymer in concentrated sulphuric acid containing 1 g of polymer in 100 cm³ of solution, a crystalline melting point of greater than 350°C, an infra-red spectrum with strong adsorption at 6.0 μm and absence of adsorption peaks at both 7.55 and 8.6 μm and consisting of repeat units having the formula

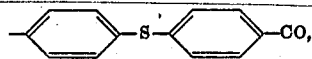

said oxidation product consisting of repeat units having the formula

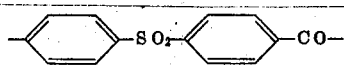

and being further characterized by an infra-red spectrum showing strong adsorption at 6.0, 7.55 and 8.6 μm.

* * * * *

PO-1050
(5/69)

UNITED STATES PATENT OFFICE
CERTIFICATE OF CORRECTION

Patent No. 3,819,582          Dated June 25, 1974

Inventor(s) Ronald George Feasey

It is certified that error appears in the above-identified patent and that said Letters Patent are hereby corrected as shown below:

In the heading of the patent, add:

-- [30]     Foreign Application Priority Data

December 23, 1970    Great Britain .... 61172/70

Signed and sealed this 5th day of November 1974.

(SEAL)
Attest:

McCOY M. GIBSON JR.            C. MARSHALL DANN
Attesting Officer               Commissioner of Patents